US010857967B2

(12) United States Patent
Wayment

(10) Patent No.: US 10,857,967 B2
(45) Date of Patent: Dec. 8, 2020

(54) INITIATOR FOR AN AUTOMOTIVE SAFETY DEVICE

(71) Applicant: Autoliv ASP, Inc., Ogden, UT (US)

(72) Inventor: Mason Chappell Wayment, Roy, UT (US)

(73) Assignee: Autoliv ASP, Inc., Ogden, UT (US)

(*) Notice: Subject to any disclaimer, the term of this patent is extended or adjusted under 35 U.S.C. 154(b) by 171 days.

(21) Appl. No.: 16/287,844

(22) Filed: Feb. 27, 2019

(65) Prior Publication Data
US 2020/0269801 A1 Aug. 27, 2020

(51) Int. Cl.
*B60R 21/26* (2011.01)
*F42B 3/182* (2006.01)
*F42B 3/103* (2006.01)
*F42B 3/198* (2006.01)

(52) U.S. Cl.
CPC .............. *B60R 21/26* (2013.01); *F42B 3/182* (2013.01); *B60R 2021/26029* (2013.01); *F42B 3/103* (2013.01); *F42B 3/198* (2013.01)

(58) Field of Classification Search
CPC .................. B60R 21/26; B60R 21/272; B60R 2021/26029; F42B 3/04; F42B 3/182; F42B 3/103; F42B 3/198
See application file for complete search history.

(56) References Cited

U.S. PATENT DOCUMENTS

| | | | | |
|---|---|---|---|---|
| 2,240,438 A * | 4/1941 | Durant | ..................... | F42B 3/103 102/202.14 |
| 4,690,063 A * | 9/1987 | Granier | ..................... | F42B 3/04 102/202 |
| 5,423,261 A * | 6/1995 | Bernardy | ................ | F42B 3/103 102/202.14 |
| 5,794,973 A * | 8/1998 | O'Loughlin | .......... | B60R 21/272 102/531 |
| 6,206,414 B1 * | 3/2001 | Cook | ..................... | B60R 21/272 280/734 |
| 7,117,796 B1 * | 10/2006 | Bogle | ....................... | C06C 9/00 102/275.6 |

(Continued)

FOREIGN PATENT DOCUMENTS

| | | | |
|---|---|---|---|
| DE | 39 39 258 A1 * | 6/1991 | ................ F42B 3/10 |
| DE | 29921493 | 5/2000 | |

(Continued)

OTHER PUBLICATIONS

International Search Report and Written Opinion dated Apr. 30, 2020 for international application PCT/US2020/017775.

*Primary Examiner* — Frank B Vanaman
(74) *Attorney, Agent, or Firm* — Stoel Rives LLP

(57) ABSTRACT

An initiator assembly for an automotive safety device includes a tubular housing with a first end and a second end. A cruciform formed in the second end of the tubular housing is designed to open when the initiator fires. A pyrotechnic load is disposed within the tubular housing at the second end, the pyrotechnic load is formed to define a void comprising an open end and a tip. The void includes sides that extend from the open end to the tip and angle toward the second end of the tubular housing and angle toward a longitudinal axis of the tubular housing. The sides of the void can transition into a tip portion of the void that comprises a geometry distinct from that of the sides.

20 Claims, 6 Drawing Sheets

(56) References Cited

U.S. PATENT DOCUMENTS

2005/0039623 A1     2/2005  Furusawa et al.
2009/0158953 A1 *   6/2009  Magne .................... F42B 3/198
                                                      102/206

FOREIGN PATENT DOCUMENTS

| DE | 10211347      |   | 1/2007 |             |
|----|---------------|---|--------|-------------|
| DE | 10 2007 001 640 | * | 7/2008 | ............ B60R 21/26 |
| EP | 0607671       |   | 7/1994 |             |
| GB | 404361        |   | 1/1934 |             |
| WO | 199906786     |   | 2/1999 |             |
| WO | 2018166720    |   | 9/2018 |             |

* cited by examiner

INITIATOR FOR AN AUTOMOTIVE SAFETY DEVICE

TECHNICAL FIELD

The present disclosure relates generally to the field of automotive protective systems. More specifically, the present disclosure relates to automotive safety systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

During a vehicle collision event, a number of sensors provide data to an engine control unit ("ECU") and/or airbag control unit ("ACU"), which determines if threshold conditions have been met for deployment of an automotive safety device such as an airbag (or a plurality of airbags). The ECU/ACU may cause an electrical pulse to be sent to an initiator of an automotive safety device, such as to an initiator of an inflator of an airbag.

An initiator comprises a pyrotechnic relay load which heats or burns. In the case of an airbag assembly, the initiator may ignite a chemical compound within an inflator of an airbag assembly. The chemical compound burns rapidly and produces a volume of inert gas which is directed to fill the airbag itself. In other airbag assembly embodiments, the initiator may produce an volume of gas that increases pressure within a compressed air chamber, thereby bursting the chamber and releasing a larger volume of inflation gas to fill the air bag.

During installation, airbags are typically disposed at an interior of a housing in a packaged state (e.g., are rolled, folded, and/or otherwise compressed) or a compact configuration and may be retained in the packaged state behind a cover. During a collision event, an electrical current is sent to an initiator, which triggers an inflator, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The electrical current may be sent to the initiator by any suitable device or system, and may be in response to and/or influenced by one or more vehicle sensors.

The present disclosure describes embodiments of initiator assemblies in the operation with various types of airbag inflators and airbag assemblies, including, for example, front air bags, inflatable curtains, passenger air bags, side airbags, etc. The disclosed embodiments of initiator assemblies may also be utilized in conjunction with any of a variety of automotive safety devices in addition to inflatable airbag modules, including but not limited to a knee bolster, a seat belt pretensioner, a tether cutter, or any other safety device that may use pyrotechnics.

Figure 1:
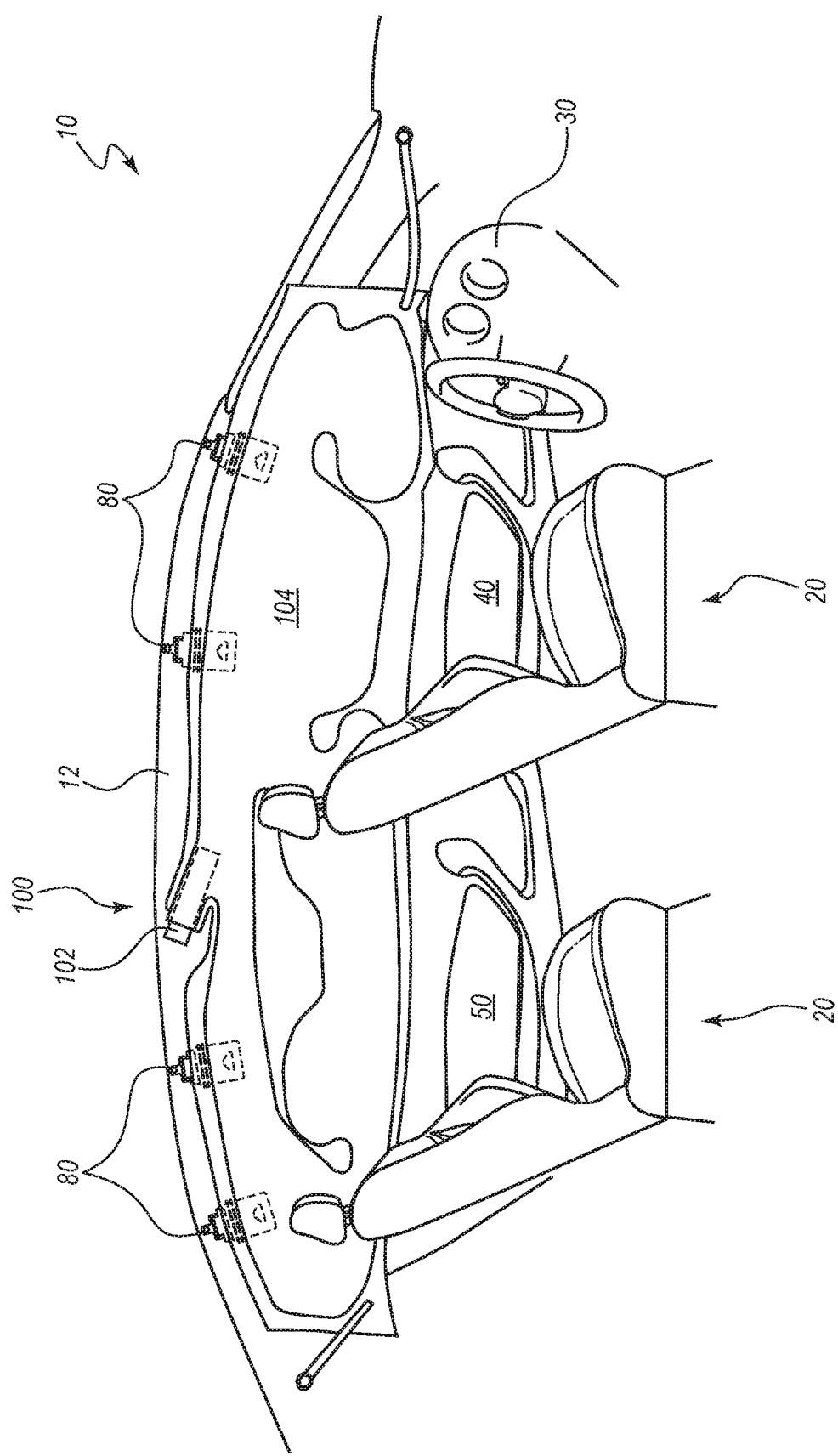
FIG. 1 is a side view of an interior of a motor vehicle illustrating an inflatable airbag module, according to one embodiment.

FIG. 1 is a side view of an interior of a motor vehicle including an inflatable airbag module, according to one embodiment. Various aspects of the present disclosure include initiators of inflators adapted for use with inflatable airbag modules. Such inflatable airbag modules may be employed in various locations within a motor vehicle. For example, FIG. 1 shows a side view of the interior of a motor vehicle 10 illustrating an inflatable airbag module 100, according to at least one example. The inflatable airbag module 100 includes an inflator 102 and an inflatable airbag cushion 104, illustrated as a deployed inflatable curtain. The inflatable airbag module 100 and the airbag cushion 104 are positioned and configured to provide protection for an occupant sitting in a seat 20 in the motor vehicle 10. In some embodiments, the airbag cushion 104 may include brackets 80 to secure the airbag cushion 104 to the roof 12 of the motor vehicle 10. In an accident in which the motor vehicle 10 is decelerated, the occupant may tend to move forwardly toward an instrument panel 30, but may be restrained by a seat belt and/or airbag. In the case of a side impact (e.g., side collision, roll-over), the person may strike the window in a door 40, 50 beside the occupant, the vehicle B-pillar, or both.

The airbag cushion 104, which may also be referred to as an inflatable cushion and is shown in the operative (e.g., deployed) state in FIG. 1, is initially retained in a recess provided in the doorframe located above the door 40, 50 of the motor vehicle 10. The recess may extend over more than simply a linear portion of the doorframe so that the two ends of the recess may not be in alignment with the main part of the recess. The inflator 102 is adapted to provide an inflation fluid to the airbag cushion 104 for its inflation.

The inflator 102 may be associated with a sensor (not shown) which senses a side impact situation and activates the inflator 102 at the appropriate instant. The inflator 102 can be connected by a hose to a duct that forms a part of the airbag cushion 104.

When an accident occurs, such as a side impact, the inflator 102 produces, forms, or otherwise supplies an inflation fluid, which is passed into the hose and then the duct and inflates the airbag cushion 104. The airbag cushion 104 thus moves from its initial stored position within the recess in the doorframe or roof 12 to the operative state shown in FIG. 1. That is, the airbag cushion 104 extends downwardly from the top of the doorframe or roof 12 to form a generally flat structure located between a least a portion of the person and a portion of the motor vehicle 10 (e.g., between the head of the person and the adjacent window or B-pillar).

While the example described with reference to FIG. 1 involves an airbag cushion 104 adapted for use as an inflatable curtain, other embodiments of initiators of the present disclosure may be employed for other types of airbag cushions, including, but not limited to, other side impact (e.g., head thorax, combined) airbag cushions, knee airbag cushions, as well as other airbag cushions for use in a motor vehicle.

Further, the disclosed embodiments of initiator assemblies may be utilized in conjunction with any of a variety of automotive safety devices in addition to inflatable airbag modules, including but not limited to frontal airbags, inflatable curtains, side airbags, passenger airbags, knee airbags, knee bolsters, seat belt pretensioners, tether cutters, or any other safety devices using pyrotechnics.

Figure 2:
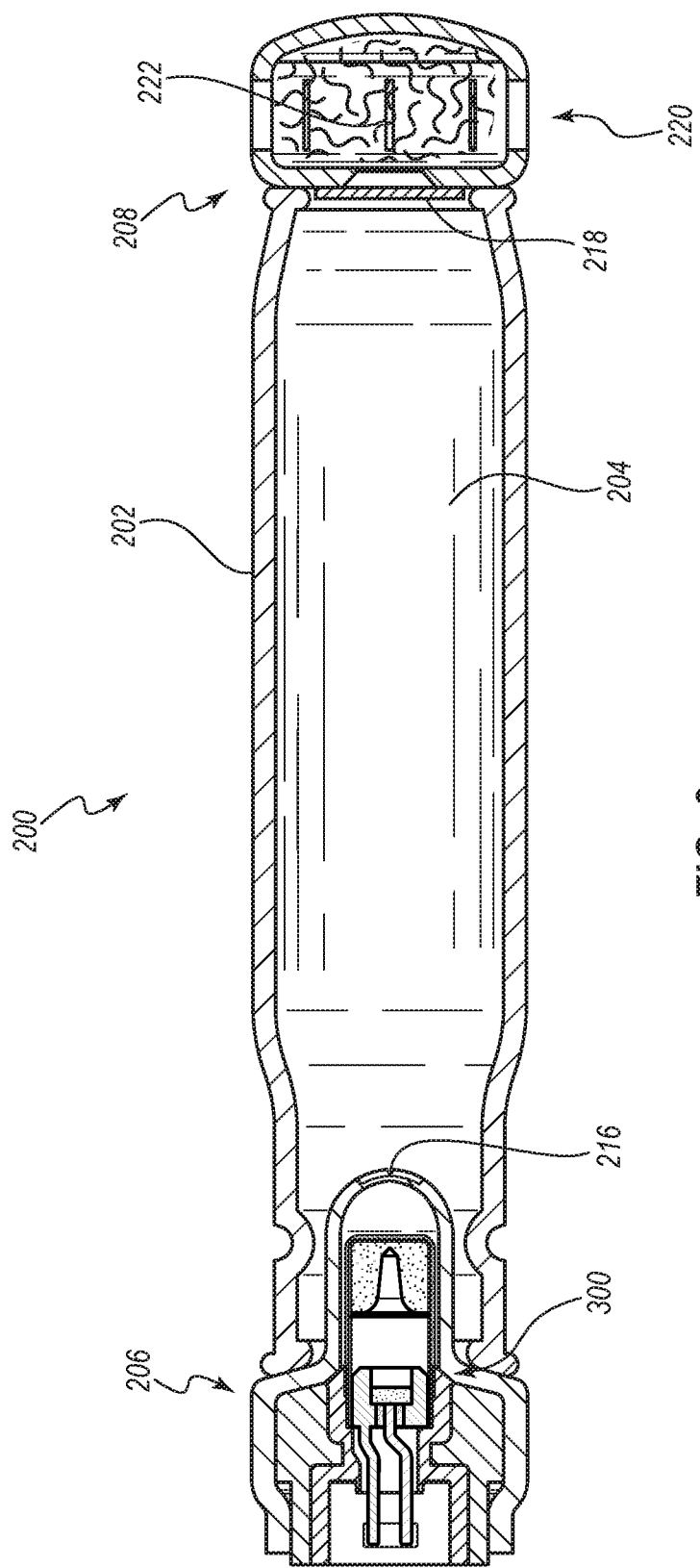
FIG. 2 is a cross-sectional view of an inflator, according to one embodiment.

FIG. 2 illustrates a side view of an inflator 200, according to one embodiment. The inflator 200 generally includes an elongated hollow tube 202 defining a chamber 204 for enclosing a quantity of fluid therein. The fluid may comprise a stored fluid, such as a pressurized expandable fluid. However, other examples of the inflator 200 may be adapted to enclose a quantity of gas generant adapted to be converted into a supply of inflation fluid during deployment, as well as a combination of stored fluid and gas generant, commonly referred to as a "hybrid." In some embodiments in which the inflator 200 encloses a quantity of gas generant, either alone or in combination with a stored fluid, the gas generant may be disposed within the chamber 204 in a manner to provide an opening adapted to enable a pressure wave, described below, to pass through at least substantially unimpeded.

The hollow tube 202 may be composed of a metal or metal alloy, such as steel, magnesium alloy, etc., and may be formed by any suitable method, such as stamping, machining, casting, extrusion, etc. The hollow tube 202 includes opposing first and second longitudinal ends, 206 and 208, respectively.

An initiator assembly 300 may be disposed within the inflator 200. The initiator assembly 300 may be positioned in the first longitudinal end 206. In some embodiments, the initiator assembly 300 may be coupled to the first longitudinal end 206 by, for example, an inertial weld. In other embodiments, at least a portion of the initiator assembly 300 may be formed integral to the hollow tube 202 of the inflator 200. The initiator assembly 300 is adapted to inflate (e.g., ignite) and/or release the stored fluid in the inflator 200 upon receipt of an electrical signal, such as may be generated by a sensor (not shown) upon the sensing of a collision.

The initiator assembly 300 may be separated from the chamber 204 by a base dome or housing 216. The base dome 216 may comprise any rupturable device or other temporary closure device that can be position between the initiator assembly 300 and the chamber 204. The base dome 216 may include one or more scored seams to facilitate the rupturing of the base dome 216 after the initiator assembly 300 is fired.

The second longitudinal end 208 of the hollow tube 202 may be enclosed with a burst disk 218. The burst disk 218 may comprise any rupturable device or other temporary closure device that can be positioned over an outlet at the second longitudinal end 208 of the hollow tube 202. In some instances, the burst disk 218 may include one or more scored seams to facilitate the rupturing of the burst disk 218. The burst disk 218 may generally be rupturable to open and enable a compressed gas to exit the chamber 204 and inflate an inflatable airbag cushion, such as the airbag cushion 104 in FIG. 1.

The inflator 200 may further include a diffuser assembly 220 disposed at the second longitudinal end 208 of the hollow tube 202. The diffuser assembly 220 may be formed integral with or appropriately coupled to the second longitudinal end 208. For example, the diffuser assembly 220 may be coupled to the second longitudinal end 208 with an inertial weld, or the diffuser assembly 220 may be formed integral with the hollow tube 202. A diffusing material 222 may be disposed within the diffuser assembly 220 for diffusing the gas as the gas is expelled from the inflator 200 to the airbag cushion 104.

Figure 3A:
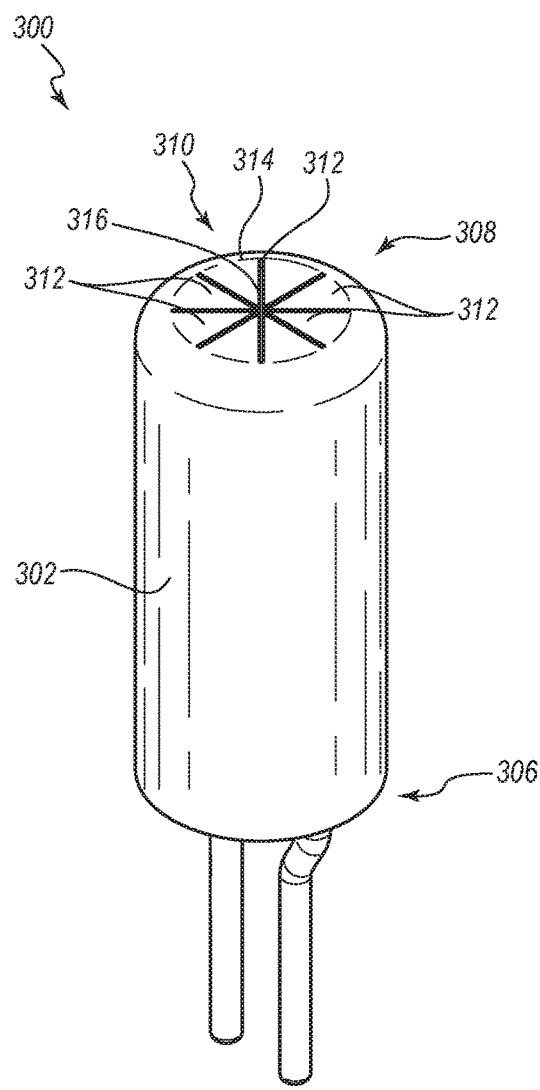
FIG. 3A is an isometric view of an initiator assembly, according to one embodiment.
Figure 3B:
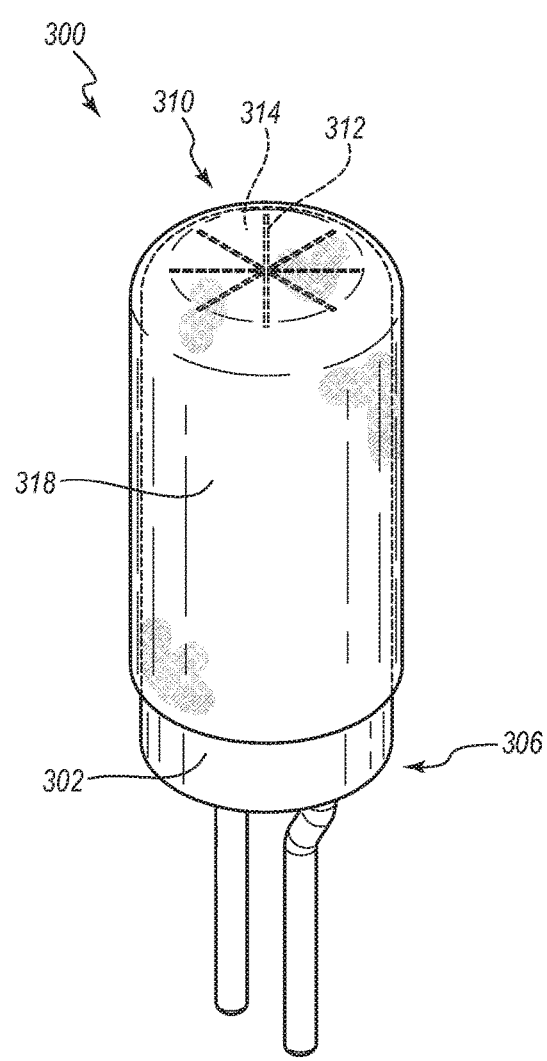
FIG. 3B is an isometric view of the initiator assembly of FIG. 3A with a dielectric layer.

FIGS. 3A and 3B illustrate an isometric view of an initiator assembly 300, according to one embodiment. The initiator assembly 300 comprises a hollow tubular housing 302 (e.g., an initiator cup). The tubular housing 302 includes opposing first and second longitudinal ends, 306 and 308, respectively. The first longitudinal end 306 may also be referred to as a proximal end of the initiator assembly 300 and the second longitudinal end 308 may be referred to as a distal end of the initiator assembly 300. In some embodiments, an electrical insulation layer 318 encompasses a portion (e.g., a majority) of the tubular housing 302 and the second longitudinal end 308, as illustrated in FIG. 3B. The electrical insulation layer 318 may be a high dielectric plastic layer to help prevent inadvertent deployment of the initiator assembly 300, such as by an inadvertent electrical charge as may occur through buildup of static electricity. In some embodiments, the tubular housing 302 does not include the electrical insulation layer 318, as illustrated in FIG. 3A.

Figure 4:
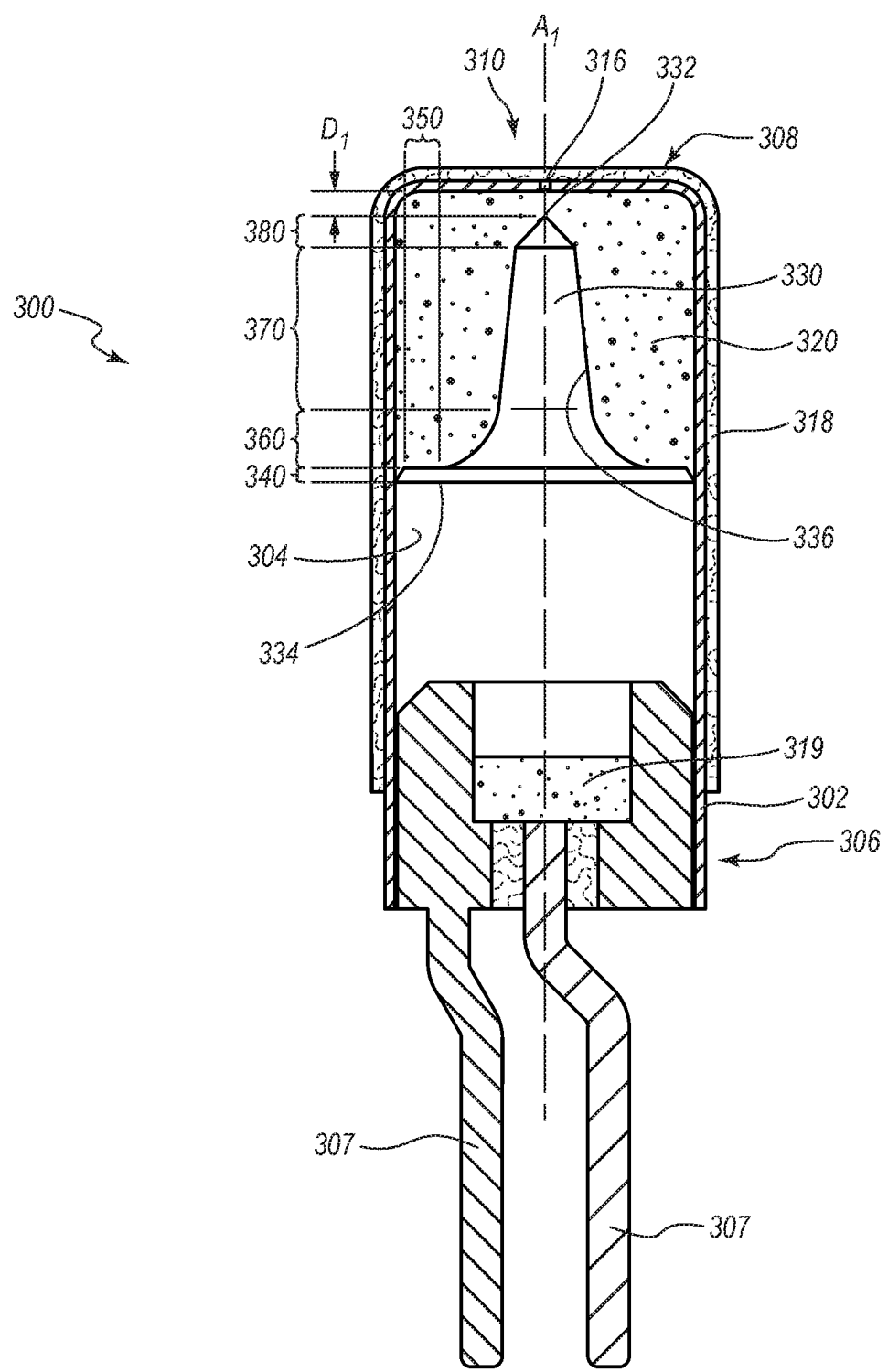
FIG. 4 is a cross-sectional view of an initiator assembly, according to one embodiment.
Figure 5:
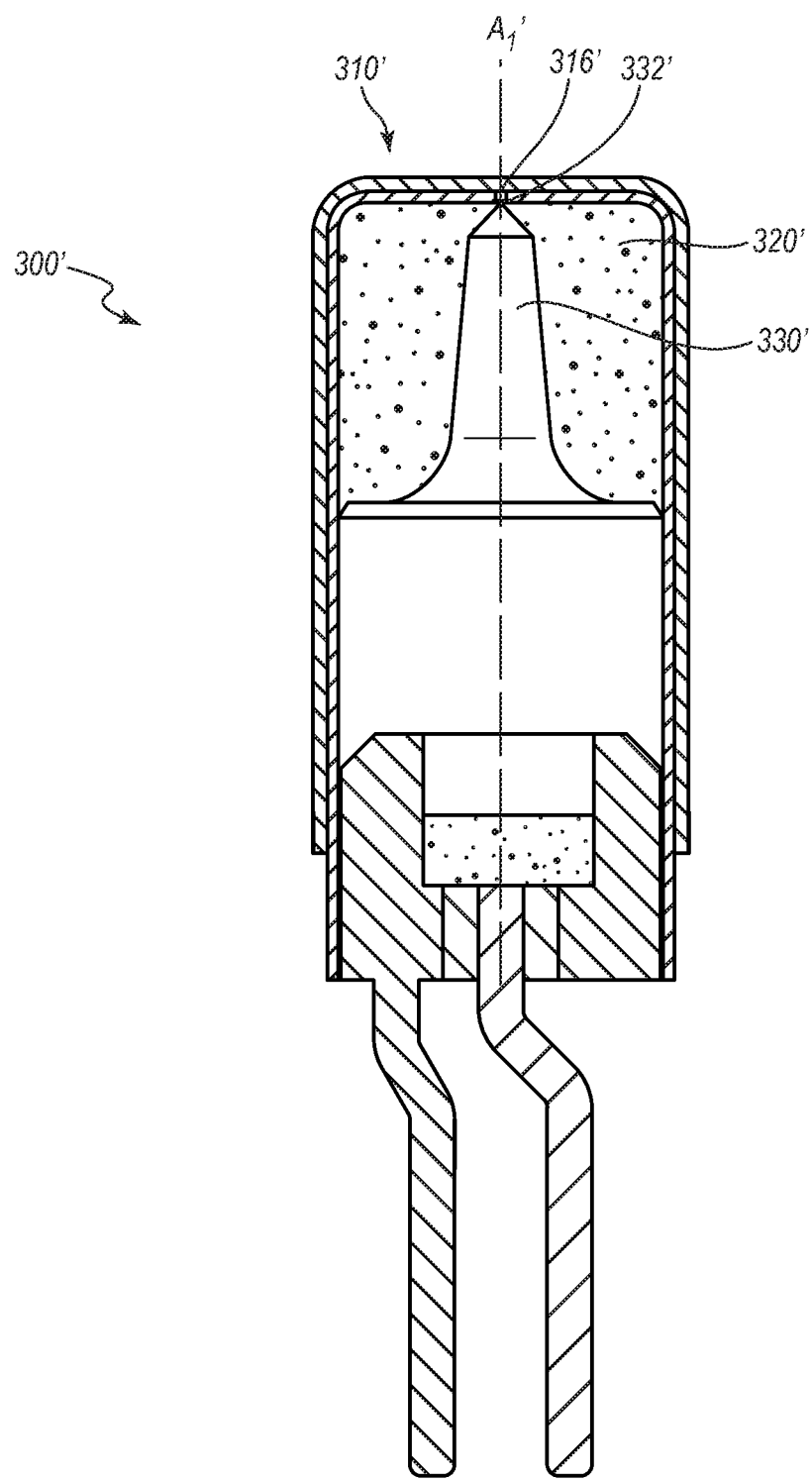
FIG. 5 is a cross-sectional view of an initiator assembly, according to another embodiment.

As illustrated in FIGS. 3A and 3B, a cruciform 310 may be formed in the second longitudinal end 308 of the tubular housing 302. The cruciform 310 is illustrated in broken lines in FIG. 3B since the cruciform 310 is disposed beneath the electrical insulation layer 318. The cruciform 310 may comprise a plurality of weakened lines 312 that form a pattern. The weakened lines 312 are designed to open in a predetermined manner based on the pattern. In the illustrated embodiment, the cruciform 310 includes four weakened lines 312 that extend radially across the second longitudinal end 308, forming a pair of crosses. The pair of crosses form a plurality of sections 314 with a weakened center 316 that is aligned with a longitudinal axis A1 of the tubular housing 302, as seen in FIGS. 4 and 5. While FIGS. 3A and 3B merely illustrate a single pattern, the cruciform 310 may have a number of different patterns, all of which are within the scope of this disclosure.

FIG. 4 illustrates a cross-sectional view of an embodiment of the initiator assembly 300. The initiator assembly 300 includes a chamber 304. The initiator assembly 300 may include a primary pyrotechnic load 319 and a secondary pyrotechnic load 320 disposed within the chamber 304. In some embodiments, the secondary pyrotechnic load 320 may be dense and/or compacted and may be otherwise substantially free from internal voids, pockets, or cavities. The primary pyrotechnic load 319 and the secondary pyrotechnic load 320 may be longitudinally spaced apart from each other with the primary pyrotechnic load 319 disposed at a first end 306 of the chamber 304 and the secondary pyrotechnic load 320 disposed at a second end 308 of the chamber 204. The initiator assembly 300 may further comprise electrical conductors 307 (e.g., pins) that are configured to ignite the primary pyrotechnic load 319 when an electrical signal is received resulting from a collision event. The electrical signal may pass through a bridgewire across a distal end of the electrical conductors 307 so as to ignite the primary pyrotechnic load 319. The primary pyrotechnic load 319 may then ignite the secondary pyrotechnic load 320, which produces a sufficient pressure wave to open the cruciform 310 outwardly. The ignition of the secondary pyrotechnic load 320 is configured to open the cruciform 310 by directing an initial pressure wave through a tip 332 of a void 330 (formed in the secondary pyrotechnic load 320) and toward the weakened center 316 of the cruciform 310 to open the cruciform 310 outward. In some embodiments, the initiator assembly 300 may include a combined primary and secondary pyrotechnic load 319, 320.

The primary pyrotechnic load 319 and the secondary pyrotechnic load 320 may be one or more of a variety of different pyrotechnic materials. For example, in one embodiment, the primary pyrotechnic load 319 may be Zirconium Potassium Perchlorate (ZPP) and the secondary pyrotechnic load 320 may be Titanium Hydride Potassium Perchlorate (THPP), Boron Potassium Nitrate ($BKNO_3$), Cupric Oxide (CuO), or any other suitable composition.

The secondary pyrotechnic load 320 may be formed or shaped to define the void 330 (e.g., cavity, space, hole, crater) within the secondary pyrotechnic load 320. The void 330 formed in the secondary pyrotechnic load 320 includes the tip 332 that aligns with the longitudinal axis A1 of the tubular housing 302 and an open end 334. The shape of the void 330 achieves several benefits for the initiator assembly 300. One benefit of the void 330 is that the void 330 helps reduce variation in the opening of the cruciform 310 of initiator assembly when the secondary pyrotechnic load 320 is ignited. Specifically, the variation in the amount of time to open the cruciform 310 after the pyrotechnic loads 310 and 320 are ignited. The variation is reduced because the burning of the secondary pyrotechnic load 320 generates or creates a consistent initial pressure wave that predictably causes the weakened center 316 of the cruciform 310 to fail. This predictability of the generation of this pressure wave can be consistently reproduced by each initiator, according to the disclosed embodiments. The void 330 can be configured to direct the initial pressure wave toward the tip 332. The alignment of the tip 332 and the weakened center 316 of the cruciform 310 helps create the consistent initial pressure wave since the tip 332 of the void 330 tends burn through the secondary pyrotechnic load 320 disposed at the tip 332 through to the tubular housing 302 before any other location in the secondary pyrotechnic load 320, thereby allowing the pressure generated within the tubular housing to exert force on the weakened center 316 of cruciform 310. The void 330 in the secondary pyrotechnic load 320 also provides an increased burn surface area.

The void 330 may comprise a plurality of distinct geometries. The various distinct geometries discussed therein may be combined in a number of different combinations and still be within the scope of the present disclosure. In the illustrated embodiment of FIG. 4, the void 300 comprises five distinct geometries. However, in some embodiments, the void 330 may only include two of the distinct geometries. In some embodiments, the void 330 may only include three of the distinct geometries.

The void 330 includes sides 336 that extend from an open end 334 to the tip 332. The sides 336 may, in some embodiments be a wall of the secondary pyrotechnic load 320 that defines (and e.g., interfaces) the void 330. In some embodiments, the sides may be a single wall (e.g., having a cylindrical shape, such that the void 330 may have a circular cross-section (e.g., within a transverse plane perpendicular to the longitudinal axis A1). The diameter of the cross-sectional shape may decrease over the length of the void 330 from the open end 334 to the tip 332. In some embodiments, the void 330 may include various types of cross-section shapes, for example, circular, triangular, square, rectangular, and the like. In some embodiments, the cross-sectional shape of the void 330 may transition from the open end 334 to the tip 332. As discussed below in regard to distinct geometries, each geometry may comprise its own distinct cross-sectional shape.

The sides 336 of the void 330 angle toward the second end 308 of the tubular housing 302 and toward a longitudinal axis of the tubular housing 302. The sides 336 of the void 330 transition into a tip portion 380 that comprises a geometry distinct from the sides 336.

In the illustrated embodiment of FIG. 4, the void 330 comprises an opening portion 340 that commences at a first end of the pyrotechnic load 320 and comprises sides that angle toward the second end 308 of the tubular housing 302 and toward the longitudinal axis A1 of the tubular housing 302 at constant angles. The opening portion 340 may have a circular cross-section. The opening portion 340 is configured to transition to a flat portion 350.

The flat portion 350 extends radially inward and is orthogonal to the longitudinal axis A1 of the tubular housing 302. The flat portion 350 may have a circular cross-section. The flat portion 350 is configured to transition to a curved portion 360.

The curved portion 360 comprises sides that comprise an arc or a curve that extends inward toward the longitudinal axis A1 of the tubular housing 302 and toward the second end 308 of the tubular housing 302. In some embodiments, the arc of the curved portion 360 may have a constant radius or chamfer. In some embodiments, the arc of the curved portion 360 may have an exponential curve. The curved portion 360 may have a circular cross-section (e.g., transverse cross-section perpendicular to the longitudinal axis A1). The curved portion 360 is configured to transition into a main portion 370.

The main portion 370 of the void 330 may comprise a frustum shape with a circular cross-sectional shape (e.g., transverse cross-section perpendicular to the longitudinal axis A1). The main portion 370 is configured to transition into the tip portion 380.

In the embodiment of FIG. 4, the tip portion 380 comprises a conical shape with a circular cross-section. The vertex (coincides with the tip 332) of the conical shape aligns with the weakened center 316 of the cruciform 310. In other embodiments, the tip portion 380 may comprise a dome shape with a circular cross-section. The apex of the dome would coincide with the tip 332 of the void and also align with the weakened center 316 of the cruciform 310.

A distance D1 between the tip 332 of the void 330 and the weakened center 316 of the cruciform 310 may be a predetermined distance. The distance D1 between the tip 332 of the void 330 and the weakened center 316 of the cruciform 310 may be configured to help orient the pressure wave created by the secondary pyrotechnic load 320 because the tip 332 burns through all of the secondary pyrotechnic load 320 at the tip 332 before any other area of the secondary pyrotechnic load 320. In the illustrated embodiment of FIG. 4, a portion of the secondary pyrotechnic load 320 (e.g., the portion along the distance D1) is disposed between the tip 332 and the weakened center 316 of the cruciform 310.

The distance D1 between the tip 332 of the void 330 and the weakened center 316 of the cruciform 310 is between 0 and 5 mm. In some embodiments, the distance between the tip 332 of the void 330 and the weakened center 316 of the cruciform 310 is any of less than 4 mm, less than 3 mm, less than 2 mm, and less than 1 mm. In some embodiments, the distance between the tip 332 of the void 330 and the weakened center 316 of the cruciform 310 may be less than 5% of the total length of the secondary pyrotechnic load 320 in a direction parallel to the longitudinal axis A1.

As discussed previously, the void 330 is not limited to the illustrated embodiment of FIG. 4. The void 330 may comprise a plurality of different geometries and/or portions comprising different geometries each transitioning into a different geometry.

FIG. 5 depicts an embodiment of an initiator assembly 300' that resembles the initiator assembly 300 described above in certain respects. Accordingly, like features are designated with like reference numerals but with added apostrophe. For example, the embodiment depicted in FIG. 5 includes a secondary pyrotechnic load 320' that may, in some respects, resemble the secondary pyrotechnic load 320 of FIG. 4. Relevant disclosure set forth above regarding similarly identified features thus may not be repeated hereafter. Moreover, specific features of the initiator assembly 300 and related components shown in FIG. 4 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the initiator assembly 300' and related components depicted in FIG. 5. Any suitable combination of the features, and variations of the same, described with respect to the initiator assembly 300 and related components illustrated in FIG. 4 can be employed with the initiator assembly 300' and related components of FIG. 5, and vice versa.

FIG. 5 is a cross-sectional view of an embodiment of the initiator assembly 300'. A tip 332' of a void 330' is disposed next to (immediately adjacent) the center 316' of the cruciform 310' and along a longitudinal axis A1'.

As discussed previously, the void 330 disposed within the secondary pyrotechnic load 320 helps reduce the variability of the ignition of the initiator assembly 300 and of the initial pressure wave produced by the ignition of the initiator assembly. The void 330 helps orient the pressure wave produced by the secondary pyrotechnic load 320 when the secondary pyrotechnic load 320 is ignited to open the cruciform 310 of the initiator assembly 300.

Figure 6:
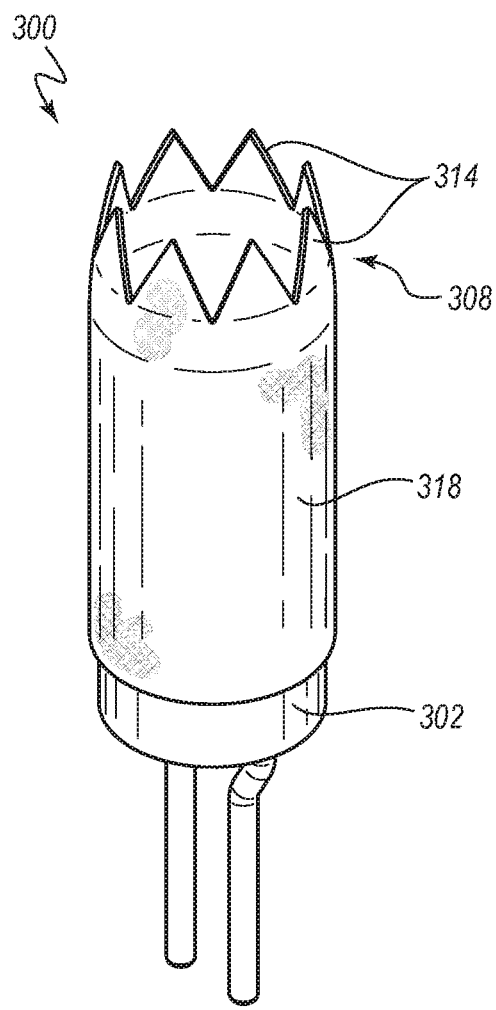
FIG. 6 is an isometric view of an initiator assembly after the initiator assembly has fired and opened a cruciform of the initiator assembly.

FIG. 6 illustrates the initiator assembly 300 in the opened configuration with the sections 314 of the cruciform 310 opened outward as the cruciform 310 is designed to open. The consistent pressure wave produced by ignition of the second pyrotechnic load causes the weakened portions or lines of the cruciform 310 to fail and the sections 314 of the cruciform 310 to burst open outward. The sections 314 may remain fully intact and connected to the housing 302 or cup of the initiator assembly 300. The electrical insulation layer 318 may offer little resistance to the opening of the cruciform 310, and may also open in a similar manner to the sections 314 when the cruciform opens outward or may be completely or partially disengaged from the initiator assembly 300 with the opening of cruciform 310.

Figure 7:
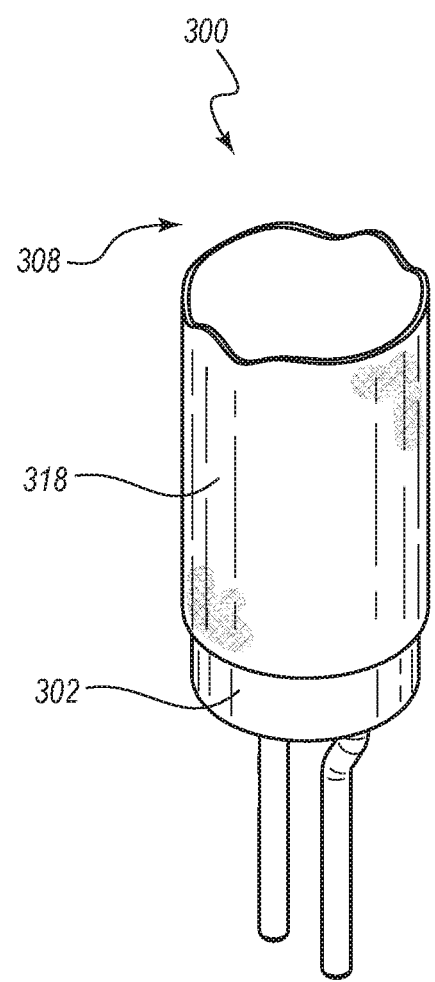
FIG. 7 is an isometric view of a fired initiator assembly that is lacking certain features of the disclosed embodiments.

FIG. 7 illustrates the initiator assembly 300 when the cruciform 310 does not open as designed. For example, in initiators that do not include the void 330 disposed in the secondary pyrotechnic load 320, the pressure wave produced by the ignition of the secondary pyrotechnic load 320 tends to blast off (or detach) the second end 308 of the initiator assembly 300 entirely rather than affecting the opening of cruciform 310, as illustrated in FIG. 7. If the second end 308 of the initiator assembly 300 blows off, the reproducibility of the opening of the cruciform 310 is disrupted, which causes inconsistent pressure wave properties from the ignition of initiator 300, which can affect inconsistent timing and performance of the inflator 200 and subsequently the performance of the inflation of the airbag cushion 104. The consistent opening characteristic of cruciform 310 may provide a similar consistent opening in base dome 216 of inflator 200, which would then provide a pressure wave having characteristics sufficient to consistently cause burst disk 218 to rupture as discussed above.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention.

Embodiments of the invention in which an exclusive property or privilege is claimed are as follows:

1. An initiator assembly for an automotive safety device comprising:
   a tubular housing with a first end and a second end;

a cruciform formed in the second end of the tubular housing; and a pyrotechnic load disposed within the tubular housing at the second end, the pyrotechnic load formed to define a void comprising an open end and a tip, the void further comprising sides that extend from the open end to the tip and angle toward the second end of the tubular housing and toward a longitudinal axis of the tubular housing, wherein the sides of the void transition into a tip portion of the void that comprises a geometry distinct from the sides.

2. The initiator assembly of claim 1, further comprising a primary pyrotechnic load disposed within the tubular housing at the first end and spaced apart from the pyrotechnic load.

3. The initiator assembly of claim 1, wherein the tip of the void aligns with a center of the cruciform.

4. The initiator assembly of claim 1, wherein the tip portion of the void comprises a conical shape, wherein the vertex of the conical shape is the tip of the void and aligns with a center of the cruciform.

5. The initiator assembly of claim 1, wherein the tip portion of the void comprises a dome shape, wherein an apex of the dome is the tip of the void and aligns with a center of the cruciform.

6. The initiator assembly of claim 1, wherein the pyrotechnic load defines at least two portions of the void that each comprise a distinct geometry.

7. The initiator assembly of claim 6, wherein the at least two portions of the void include an opening portion that commences at a first end of the pyrotechnic load and comprises sides that angle toward the second end of the tubular housing and toward the longitudinal axis of the tubular housing.

8. The initiator assembly of claim 6, wherein the at least two portions of the void include a flat portion that extends radially inward and is orthogonal to the longitudinal axis of the tubular housing.

9. The initiator assembly of claim 6, wherein the at least two portions of the void include a curved portion comprising sides that arc inward toward the longitudinal axis of the tubular housing and toward the second end of the tubular housing.

10. The initiator assembly of claim 6, wherein the at least two portions of the void include a main portion defining a frustum shape.

11. The initiator assembly of claim 1, wherein a distance from a vertex of the void to the cruciform is less than 5 percent of a total length of the pyrotechnic load.

12. The initiator assembly of claim 1, wherein a distance from a vertex of the void to the cruciform is less than 5 mm.

13. The initiator assembly of claim 1, wherein the pyrotechnic load is free of air bubbles.

14. The initiator assembly of claim 1, wherein the pyrotechnic load is titanium hydride potassium perchlorate.

15. The initiator assembly of claim 1, wherein ignition of the pyrotechnic load is configured to consistently open the cruciform by directing an initial pressure wave through the tip of the void toward a center of the cruciform to open the cruciform outward.

16. The initiator assembly of claim 1, wherein the initiator assembly is disposed within an inflator.

17. The initiator assembly of claim 16, wherein the inflator is a compressed gas inflator.

18. An initiator assembly for an airbag cushion comprising:

a tubular housing;

a cruciform disposed at a second end of the tubular housing; and a pyrotechnic load disposed within the tubular housing at a distal end, the pyrotechnic load formed to define a void comprising an open end and a tip, the void further comprising a wall of a main portion extending from the open end to the tip and angling toward the distal end of the tubular housing and toward a longitudinal axis of the tubular housing, and wherein the wall of the void transitions into a tip portion of the void that comprises a geometric shape distinct from a geometric shape formed by the wall.

19. The initiator assembly of claim 18, wherein the void has a generally frustoconical shape.

20. The initiator assembly of claim 18, wherein the void has a circular cross-section, wherein the diameter of the cross-section decreases from the open end to the tip of the void.

* * * * *